(12) United States Patent
Kim (10) Patent No.: US 11,414,090 B2
(45) Date of Patent: Aug. 16, 2022

(54) BRAKE CONTROL APPARATUS AND BRAKE CONTROL METHOD

(71) Applicant: MANDO CORPORATION, Gyeonggi-do (KR)

(72) Inventor: Jong Wook Kim, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/147,540

(22) Filed: Sep. 28, 2018

(65) Prior Publication Data

US 2019/0100218 A1 Apr. 4, 2019

(30) Foreign Application Priority Data

Sep. 29, 2017 (KR) .................. 10-2017-0127397

(51) Int. Cl.
  B60T 8/17 (2006.01)
  B60T 8/72 (2006.01)
  (Continued)

(52) U.S. Cl.
  CPC .............. B60W 50/02 (2013.01); B60T 7/12 (2013.01); B60T 8/17 (2013.01); B60T 8/72 (2013.01);
  (Continued)

(58) Field of Classification Search
  CPC ...... B60W 50/02; B60W 10/06; B60W 10/08; B60W 10/182; B60W 30/18109;
  (Continued)

(56) References Cited

U.S. PATENT DOCUMENTS 5,775,784 A * 7/1998 Koga .................. B60L 3/0023
  303/3
6,382,737 B1 * 5/2002 Isono .................. B60T 13/163
  303/114.1
(Continued)

FOREIGN PATENT DOCUMENTS

CN  102371906  3/2012
CN  105691373  6/2016
(Continued)

OTHER PUBLICATIONS

Office Action dated Nov. 7, 2018 for Korean Patent Application No. 10-2017-0127397 and its English machine translation by Google Translate.
(Continued)

*Primary Examiner* — Fadey S. Jabr
*Assistant Examiner* — Naeem Taslim Alam
(74) *Attorney, Agent, or Firm* — Ladas & Parry, LLP (57) ABSTRACT

A brake control apparatus according to an embodiment of the present disclosure includes a braking device configured to generate a braking pressure based on a hydraulic pressure to provide a main braking force to a vehicle; and a controller configured to control at least one control module selected based on the speed of the vehicle among a plurality of control modules including an engine control module (EMS) of the vehicle, a motor control module and a parking brake control module to provide an auxiliary braking force to the vehicle when the braking device is in an abnormal state.

10 Claims, 7 Drawing Sheets

(51) Int. Cl.
  *B60W 10/06* (2006.01)
  *B60W 10/08* (2006.01)
  *B60W 10/18* (2012.01)
  *B60T 7/12* (2006.01)
  *B60T 8/88* (2006.01)
  *B60W 30/18* (2012.01)
  *B60W 50/02* (2012.01)
  *B60T 8/40* (2006.01)

(52) U.S. Cl.
  CPC ............ *B60T 8/885* (2013.01); *B60W 10/06* (2013.01); *B60W 10/08* (2013.01); *B60W 10/182* (2013.01); *B60W 30/18109* (2013.01); *B60T 8/4081* (2013.01); *B60T 2250/04* (2013.01); *B60T 2270/402* (2013.01); *B60W 2510/182* (2013.01); *B60W 2520/10* (2013.01); *B60W 2710/06* (2013.01); *B60W 2710/08* (2013.01); *B60W 2710/18* (2013.01)

(58) Field of Classification Search
  CPC ....... B60W 2510/182; B60W 2520/10; B60W 2710/06; B60W 2710/08; B60W 2710/18; B60T 7/12; B60T 8/17; B60T 8/72; B60T 8/885; B60T 8/4081; B60T 2250/04; B60T 2270/402
  See application file for complete search history.

(56) References Cited

U.S. PATENT DOCUMENTS

| | | | | |
|---|---|---|---|---|
| 8,807,668 | B2* | 8/2014 | Koshimizu | B60T 7/042 303/114.1 |
| 9,346,445 | B2* | 5/2016 | Anderson | B60T 13/145 |
| 2001/0020800 | A1* | 9/2001 | Isono | B60T 13/165 303/113.5 |
| 2001/0028194 | A1* | 10/2001 | Isono | B60T 8/94 303/113.1 |
| 2003/0090148 | A1* | 5/2003 | Eliasson | B60T 13/683 303/122.09 |
| 2004/0140710 | A1* | 7/2004 | Alvarez | B60T 13/741 303/20 |
| 2011/0006591 | A1* | 1/2011 | Yoshii | B60T 13/745 303/4 |
| 2011/0035116 | A1* | 2/2011 | Ieda | B60R 21/0134 701/45 |
| 2012/0031692 | A1 | 2/2012 | Koike | |
| 2012/0303232 | A1* | 11/2012 | Yoshii | B60T 13/52 701/70 |
| 2014/0020378 | A1* | 1/2014 | Hotani | B60T 13/745 60/545 |
| 2018/0029578 | A1* | 2/2018 | Boulivan | B60T 13/662 |
| 2018/0072292 | A1* | 3/2018 | Renaud | B60T 13/686 |
| 2020/0023823 | A1* | 1/2020 | Baehrle-Miller | B60T 13/741 |

FOREIGN PATENT DOCUMENTS

| | | | |
|---|---|---|---|
| EP | 3 031 681 | 6/2016 | |
| GB | 2455507 A * | 6/2009 | ................ B60L 3/12 |
| KR | 10-0579723 | 5/2006 | |
| KR | 10-2015-0092448 | 8/2015 | |
| KR | 10-2015-0099986 | 9/2015 | |
| KR | 10-2016-0123110 | 10/2016 | |
| KR | 10-1683841 | 12/2016 | |

OTHER PUBLICATIONS

Office Action dated Dec. 10, 2021 for Chinese Patent Application No. 201811139274.3 and its English translation from Global Dossier.

\* cited by examiner

FIG. 7

BRAKE CONTROL APPARATUS AND BRAKE CONTROL METHOD

CROSS-REFERENCE TO RELATED APPLICATION(S)

This application is based on and claims priority under 35 U.S.C. § 119 to Korean Patent Application No. 10-2017-0127397, filed on Sep. 29, 2017 in the Korean Intellectual Property Office, the disclosure of which is incorporated by reference in its entirety.

BACKGROUND

1. Technical Field

Embodiments of the present disclosure relate to a brake control apparatus and a brake control method, and more particularly, to a brake control apparatus and a brake control method configured to secure a braking force when a brake system fails.

2. Description of the Related Art

A brake system for braking is necessarily equipped in a vehicle, and a variety of systems for providing stronger and more stable braking have been proposed recently.

For example, there are brake systems including an anti-lock brake system (ABS) for preventing a wheel from sliding while braking, a brake traction control system (BTCS) for preventing a drive wheel from slipping when a vehicle is suddenly unintentionally accelerated or intentionally accelerated, an electronic stability control (ESC) system for stably maintaining a driving state of a vehicle by combining an ABS with traction control to control a hydraulic pressure of a brake, and the like.

Meanwhile, a conventional brake system operates in a fallback mode when a brake apparatus under the brake systems does not operate normally. Therefore, the conventional brake system can secure braking in the case of an emergency through the operation in the fallback mode.

SUMMARY

Therefore, it is an aspect of the present disclosure to provide a brake control apparatus and a brake control method for controlling at least one control module selected based on the speed of a vehicle when a braking device is in an abnormal state.

Additional aspects of the disclosure will be set forth in part in the description which follows and, in part, will be obvious from the description, or may be learned by practice of the disclosure.

In accordance with an aspect of the present disclosure, a brake control apparatus includes: a braking device configured to generate a braking pressure based on a hydraulic pressure to provide a main braking force to a vehicle; and a controller configured to control at least one control module selected based on a speed of a vehicle among a plurality of the control modules including an engine control module (EMS) of the vehicle, a motor control module and a parking brake control module to provide an auxiliary braking force to the vehicle when the braking device is in an abnormal state.

The controller may transmit a coordination control command to the at least one of the plurality of control modules to provide the auxiliary braking force to the vehicle when the braking device is in the abnormal state.

The controller may control at least one of the plurality of control modules selected based on a comparison result between the speed of the vehicle and a predetermined reference speed.

The controller may control the at least one of the plurality of control modules when the speed of the vehicle is greater than the predetermined reference speed.

The controller may preferentially control at least one of the engine control module (EMS) and the motor control module.

The controller may control the parking brake control module among the plurality of control modules when the speed of the vehicle is equal to or lower than the predetermined reference speed.

When the braking device is in the abnormal state, the controller may control at least one of the control modules selected based on the speed of the vehicle among the plurality of control modules to provide the auxiliary braking force to the vehicle when the braking pressure corresponding to the pressure applied to a brake pedal is smaller than a predetermined target braking pressure.

When the braking device is in the abnormal state, the controller may control the at least one of the plurality of control modules selected based on whether or not autonomous emergency braking (AEB) is operated when the pressure applied to the brake pedal is not sensed.

When the braking device is in the abnormal state, the controller may control the at least one of the plurality of control modules when the pressure applied to the brake pedal is not sensed and the operation of the autonomous emergency braking (AEB) is active.

In accordance with another aspect of the present disclosure, a brake control method includes: determining whether a braking device for generating a braking pressure based on a hydraulic pressure and providing a main braking force to a vehicle is in an abnormal state; and controlling at least one control module selected based on a speed of a vehicle among a plurality of the control modules including an engine control module (EMS) of the vehicle, a motor control module and a parking brake control module to provide an auxiliary braking force to the vehicle when the braking device is in the abnormal state.

The controlling of at least one of the plurality of control modules may include selecting the at least one of the plurality of control modules based on the speed of the vehicle when the braking device is in the abnormal state; and transmitting a coordination control command to the selected at least one of the control modules to provide the auxiliary braking force to the vehicle.

The controlling of at least one of the plurality of control modules may include controlling the at least one of the plurality of control modules selected based on a comparison result between the speed of the vehicle and a predetermined reference speed.

The controlling of at least one of the plurality of control modules may include controlling the at least one of the plurality of control modules when the speed of the vehicle is greater than the predetermined reference speed.

The controlling of at least one of the plurality of control modules may include preferentially controlling at least one of the engine control module (EMS) and the motor control module when the speed of the vehicle is greater than the predetermined reference speed.

The controlling of at least one of the plurality of control modules may include controlling the parking brake control module among the plurality of control modules when the speed of the vehicle is equal to or lower than the predetermined reference speed.

The method may further include sensing a pressure applied to a brake pedal. The controlling of at least one of the plurality of control modules may include, when the braking device is in the abnormal state, controlling the at least one of the control modules selected based on the speed of the vehicle among the plurality of control modules including the engine control module (EMS) of the vehicle, the motor control module and the parking brake control module to provide the auxiliary braking force to the vehicle when the braking pressure corresponding to the sensed pressure is smaller than a predetermined target braking pressure.

The method may further include sensing a pressure applied to the brake pedal. The controlling of at least one of the plurality of control modules may include, when the braking device is in the abnormal state, controlling the at least one of the plurality of control modules selected based on whether or not autonomous emergency braking (AEB) is operated when the pressure applied to the brake pedal is not sensed.

The controlling of at least one of the plurality of control modules may include, when the braking device is in the abnormal state, controlling the at least one of the plurality of control modules when the pressure applied to the brake pedal is not sensed and the operation of the autonomous emergency braking (AEB) is active.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein and may be implemented in other forms. In the drawings, some portions not related to the description will be omitted and not be shown to clearly describe the present disclosure, and sizes of components may be somewhat exaggerated to facilitate understanding.

Figure 1:
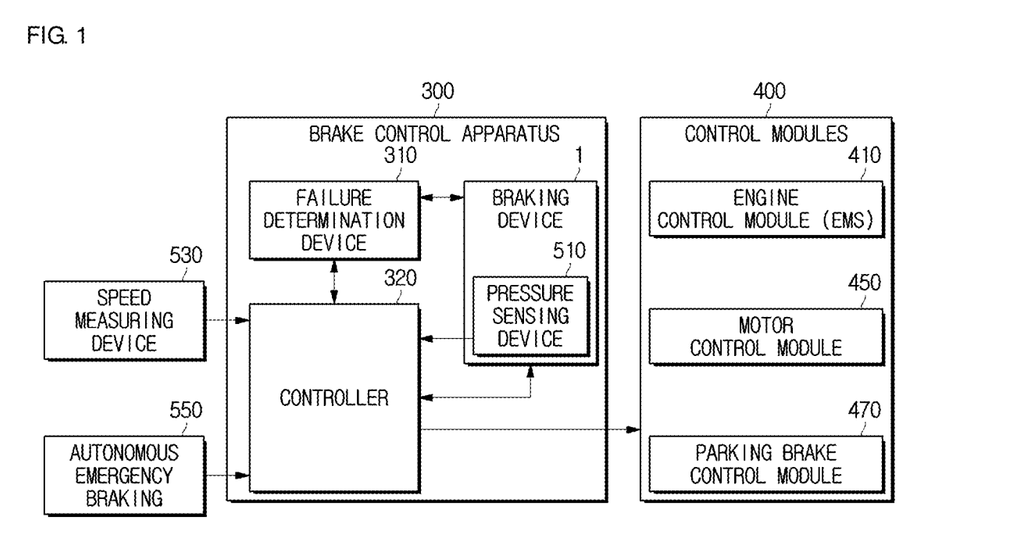
FIG. 1 is a block diagram of a brake system including a brake control apparatus according to an embodiment.

FIG. 1 is a block diagram of a brake system including a brake control apparatus according to an embodiment.

Figure 2:
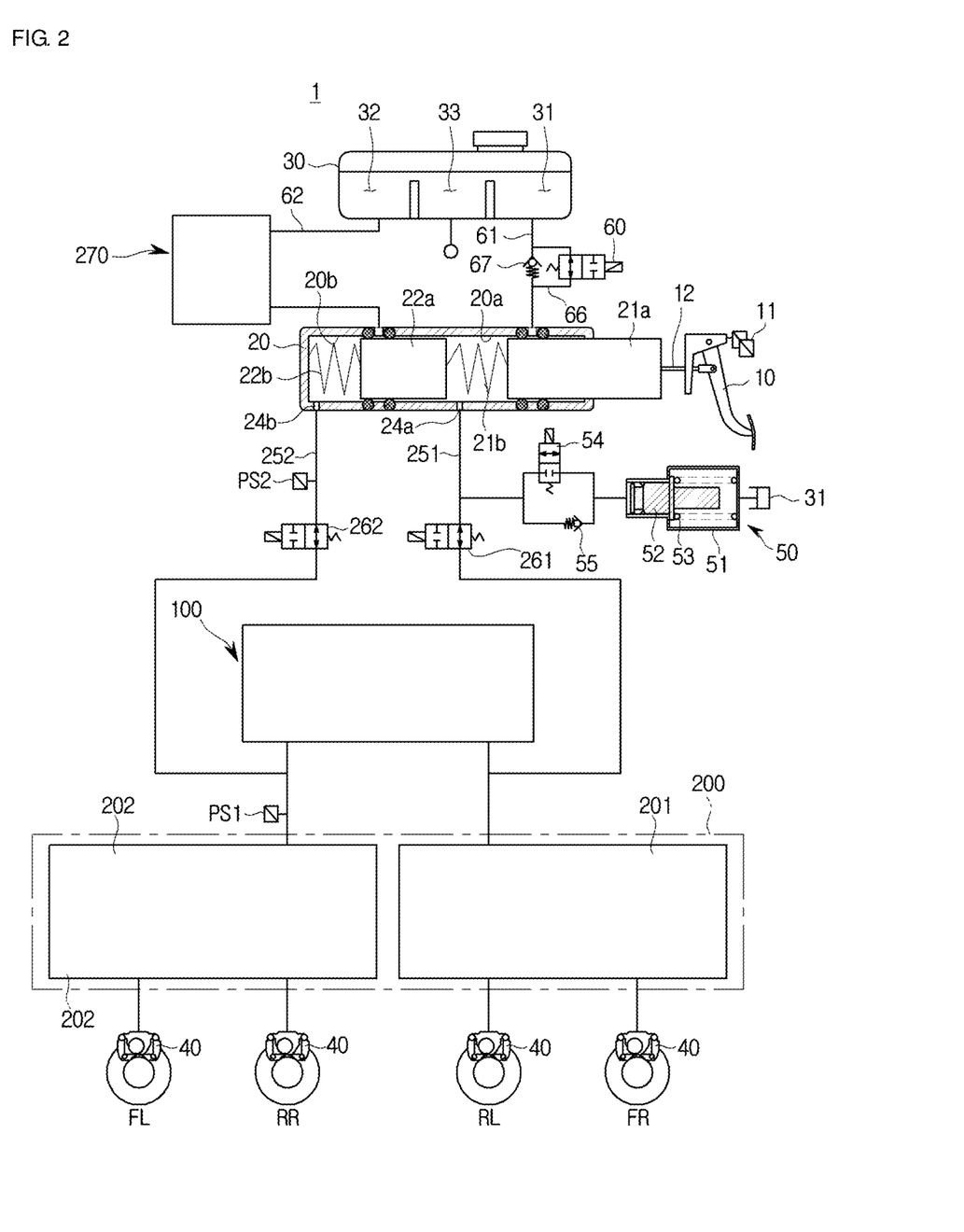
FIG. 2 is a circuit diagram illustrating a non-braking state of a braking device according to an embodiment.

Referring to FIG. 2, a brake system may include a speed measuring device 530, autonomous emergency braking 550, a brake control apparatus 300, and control modules 400.

First, the speed measuring device 530 may calculate the speed of a vehicle to obtain information such as whether the current vehicle is in a high speed driving state or a low speed driving state. The speed measuring device 530 may include a plurality of sensors including a vehicle speed sensor, and may be calculated as a distance covered by the vehicle during a driving period using a GPS satellite signal. In-vehicle information such as the number of revolutions of an engine may also be used through an automatic transmission.

The autonomous emergency braking 550 may be a device that notifies a driver of a danger in the vehicle even if there is no active instruction by the driver, or performs deceleration control automatically.

The speed measuring device 530 and the autonomous emergency braking 550 may transmit information about the vehicle to the brake control apparatus 300. The brake control apparatus 300 will be described below.

The brake control apparatus 300 may include a braking device 1, a failure determination device 310 and a controller 320. The braking device 1 may include a pressure sensing device 510.

The braking device 1 is the same as that described in FIG. 1. The pressure sensing device 510 may obtain a braking pressure (brake pressure) of wheels RR, RL, FR, FL and sense the pressure applied to a pedal.

To this end, the pressure sensing device 510 may include a plurality of pressure sensors included in a circuit diagram of the brake system 1 illustrated in FIG. 1. In particular, the sensors included in the pressure sensing device 510 may include a PS1 sensor, a PS2 sensor, and a pedal displacement sensor 11 illustrated in FIG. 1.

The failure determination device 310 may determine whether the braking device 1 is in an abnormal state. The determination whether or not the abnormal state may be determined by comparing an output value according to a test signal value with a reference output value according to the test signal value in a normal state.

In particular, the output value may be a pressure value of the actual brake pedal based on the stroke of a brake pedal 10, and may be a pressure value sensed by the PS1 sensor of FIG. 1. The determination as to whether or not the brake pedal 10 is in an abnormal state may include determining a change in the height of the brake pedal 10 after the brake pedal 10 is pressed.

At this time, the abnormal state is not limited to cases where a hydraulic pressure supply device 100 is not operating normally, but also cases where the braking pressure generated by the braking device 1 is different from the braking pressure when the braking device 1 operates normally, and the like. Specific examples are the same as those described in FIG. 1, but are not limited thereto.

When the failure determination device 310 senses the abnormal state of the braking device 1, the controller 320 may control the control modules 400 of the vehicle to secure the braking force equal to the braking force provided to the vehicle by the braking device 1 in the normal state.

In particular, the controller 320 may control the vehicle by transmitting a cooperative control command to the control modules 400 of the vehicle. To this end, the controller 320 may select at least one of the control modules 400 of the vehicle to secure the braking force, and may transmit the coordination control command to control the selected at least one control modules.

The controller 320 may use the speed of the vehicle measured by the speed measuring device 530 to select the control module to which the coordination control command is transmitted from the control modules 400 of the vehicle. In conjunction with the speed of the vehicle, the controller 320 may select the control module using at least one of the pressure applied to the brake pedal 10 sensed by the pressure sensing device 510, the operation of the autonomous emergency braking 550, or the like.

The control modules 400 of the vehicle may include an engine control module 410, a motor control module 450 and a parking brake control module 470. At least one of the control modules selected by the controller 320 may further secure the braking force of the vehicle according to the coordination control command of the controller 320. In particular, each of the control modules 400 will be described.

First, the engine control module 410 may perform fuel injection control, fuel ratio feedback control, lean burn control, ignition timing control, idling control, and the like. The engine control module 410 may be a single device, or may be a plurality of devices connected through a communication network.

The engine control module 410 may further secure the braking force of the vehicle by reducing the fuel injection of the engine or delaying the ignition timing according to the cooperative control command by the controller 320.

The motor control module 450 may perform motor control or the like that generates a rotational force by an electrical signal of the pedal displacement sensor 11. In addition, the motor control module 450 may control the rotational angular velocity and the rotational angle of the motor so that the motor generates the rotational force in a forward or reverse direction. The motor control module 450 may be a single device, or may be a plurality of devices connected through a communication network.

When the motor control module 450 receives the cooperative control command from the controller 320, the motor control module 450 may generate the rotational force in the direction opposite to the torque direction and may reverse the current direction by switching the polarity of the power supply to the electric motor with respect to the motor, thereby further securing the braking force.

The parking brake control module 470 may enable or disable the driving of the parking brake and may define a setting variable in relation to the setting braking torque to be provided by the parking brake. The parking brake control module 470 may be a single device, or may be a plurality of devices connected through a communication network.

The parking brake control module 470 may secure additional braking force by a control for driving the parking brake according to the cooperative control command transmitted from the controller 320.

The circuit diagram according to the embodiment constituting the braking device 1 of the brake control apparatus 300 included in the brake system described with reference to FIG. 1 is the same as FIG. 2. FIG. 2 is a circuit diagram illustrating a non-braking state of the braking device 1 according to an embodiment;

Referring to FIG. 2, the braking device 1 is generally configured with a master cylinder 20 configured to generate a hydraulic pressure, a reservoir 30 coupled to an upper part of the master cylinder 20 to store oil, an input rod 12 configured to pressurize the master cylinder 20 according to a pedal effort of the brake pedal 10, a wheel cylinder 40 configured to receive the hydraulic pressure and perform braking of each of the wheels RR, RL, FR, and FL, the pedal displacement sensor 11 configured to sense a displacement of the brake pedal 10, and a simulation device 50 configured to provide a reaction force according to the pedal effort of the brake pedal 10.

The master cylinder 20 may be configured to include at least one chamber to generate a hydraulic pressure. As an example, the master cylinder 20 may include a first master chamber 20a and a second master chamber 20b.

The first master chamber 20a may be provided with a first piston 21a connected to the input rod 12 and the second master chamber 20b may be provided with a second piston 22a. The first master chamber 20a may communicate with a first hydraulic pressure port 24a to allow the oil to flow in and out. The second master chamber 20b may communicate with a second hydraulic pressure port 24b to allow the oil to flow in and out. For example, the first hydraulic pressure port 24a may be connected to a first backup flow path 251, and the second hydraulic pressure port 24b may be connected to a second backup flow path 252.

The master cylinder 20 may include the first and second master chambers 20a and 20b to secure safety if one chamber fails. For example, the first master chamber 20a of the first and second master chambers 20a and 20b may be connected to the front right wheel FR and the rear left wheel RL of the vehicle through the first backup flow path 251, and the remaining second master chamber 20b may be connected to the front left wheel FL and the rear right wheel RR of the vehicle through the second backup flow path 252. As described above, the first and second master chambers 20a and 20b may be independently configured such that braking of the vehicle may be possible even when one of the first and second master chambers 20a and 20b fails.

Unlike the one illustrated in the drawing, one master chamber of two master chambers may be connected to the two front wheels FR and FL, and the remaining master chamber may be connected to the two rear wheels RR and RL.

In addition, one master chamber of the two master chambers may be connected to the left front wheel FL and the left rear wheel RL, and the remaining master chamber may be connected to the right rear wheel RR and the right front wheel FR. That is, the positions of the wheels connected to the master chambers of the master cylinder 20 may be variously configured.

Also, a first spring 21b may be provided between the first piston 21a and the second piston 22a of the master cylinder 20, and a second spring 22b may be provided between the second piston 22a and a distal end of the master cylinder 20. That is, the first spring 21b may be accommodated in the first master chamber 20a and the second spring 22b may be accommodated in the second master chamber 20b.

The first spring 21b and the second spring 22b are compressed by the first piston 21a and the second piston 22a which move as a displacement of the brake pedal 10 is varied, and thus an elastic force is stored. Further, when a force pushing the first piston 21a is less than the elastic force, the first spring 21b and the second spring 22b may use the stored restoring elastic force to push the first and second pistons 21a and 22a, respectively and return the first and second pistons 21a and 22a to their original positions.

The input rod 12 configured to pressurize the first piston 21a of the master cylinder 20 may be in close contact with the first piston 21a. That is, there may be no gap between the master cylinder 20 and the input rod 12. Consequently, when the brake pedal 10 is depressed, the master cylinder 20 may be directly pressurized without a pedal dead stroke section.

The first master chamber 20a may be connected to the reservoir 30 through a first reservoir flow path 61 and the second master chamber 20b may be connected to the reservoir 30 through a second reservoir flow path 62.

The master cylinder 20 may include two sealing members 25a and 25b disposed on the front and rear of the first reservoir flow path 61 and two sealing members disposed on the front and rear sides of the second reservoir flow path 62. The sealing members may be in the form of a ring protruding from the inner wall of the master cylinder 20 or the outer peripheral surface of the first and second pistons 21a and 22a.

A check valve 67 for preventing the flow of the oil flowing from the first master chamber 20a to the reservoir 30 while allowing the flow of oil flowing from the reservoir 30 to the first master chamber 20a may be provided in the first reservoir flow path 61. The check valve 67 may be provided to allow only one directional fluid flow.

The front and rear of the check valve 67 of the first reservoir flow path may be connected by a bypass flow path 66. The check valve 60 may be provided on the bypass flow path 66.

The check valve 60 may be provided as a bidirectional control valve for controlling the flow of oil between the reservoir 30 and the master cylinder 20. The check valve 60 may be a normally open type solenoid valve that is normally open and operates to close the valve when receiving a close signal from the controller 320.

The simulation device 50 may be connected to the first backup flow path 251 to provide a reaction force according to a pedal effort of the brake pedal 10. A reaction force may be provided to compensate for a pedal effort provided from the driver such that a braking force may be finely controlled as intended by the driver.

Referring to FIG. 2, the simulation device 50 includes a simulation chamber 51 provided to store oil flowing out from the first hydraulic pressure port 24a of the master cylinder 20, a reaction force piston 52 provided inside the simulation chamber 51, a pedal simulator provided with a reaction force spring 53 that is configured to elastically support the reaction force piston 52, and a simulator valve 54 connected to a rear end part of the simulation chamber 51.

The reaction force piston 52 and the reaction force spring 53 are installed to have a predetermined range of a displacement within the simulation chamber 51 by oil flowing therein.

Meanwhile, the reaction force spring 53 is only one embodiment capable of providing the elastic force to the reaction force piston 52, and may include various embodiments capable of storing the elastic force by deforming the shape. For example, the reaction force spring 53 may be made of a material such as rubber, or may include various members capable of storing the elastic force by having a coil or a plate shape.

The simulator valve 54 may be provided in a flow path connecting the first backup flow path 251 and the simulation chamber 51. The front end of the simulation chamber 51 may be connected to the master cylinder 20 through the simulator valve 54 and the first backup flow path 251 and the rear end of the simulation chamber 51 may be connected to the reservoir 30.

The simulator valve 54 may be configured with a normally closed type solenoid valve that is usually kept in a closed state. When the driver applies a pedal effort to the brake pedal 10, the simulator valve 54 may be opened to deliver oil into the simulation chamber 51 to the reservoir 30.

Further, when the reaction force piston 52 is returned while the simulator valve 54 is opened, the oil of the reservoir 30 may be introduced and the entire interior of the simulation chamber 51 may be filled with oil.

Also, a simulator check valve 55 may be installed to be connected in parallel with the simulator valve 54 between the pedal simulator and the reservoir 30. The simulator check valve 55 may allow the oil in the simulation chamber 51 to flow into the first master chamber 20a and may block the oil in the first master chamber 20a from flowing toward the simulation chamber 51 through a flow path at which the simulator check valve 55 is installed. Therefore, a quick return of the pedal simulator pressure may be secured because the oil in the simulation chamber 51 can escape through the simulator check valve 55 when the brake pedal 10 is released.

The operation of the simulation device 50 will be described. The oil introduced through the open simulator valve 54 presses the reaction force piston 52 of the pedal simulator and the oil in the simulation chamber 51 pushing the reaction force piston 52 while compressing the reaction force spring 53 is transmitted to the reservoir 30 when the driver applies pressure to the brake pedal 10. The driver may be provided with a pedal feeling during this process.

Meanwhile, when the driver releases his or her foot from the brake pedal 10, the reaction force piston 52 with the pressure released may return to the original position by the elastic force of the reaction force spring 53, and the oil in the reservoir 30 may be filled into the simulation chamber 51 while the oil in the reservoir 30 flows into the simulation chamber 51. Meanwhile, the oil filled into the front end of the reaction force piston 52 in the simulation chamber 51 may be returned to the master cylinder 20 through the flow path in which the simulator valve 54 is installed and the flow path in which the simulator check valve 55 is installed.

As described above, since the inside of the simulation chamber 51 is always filled with the oil in the braking state and the releasing state, the friction of the reaction force piston 52 may be minimized during operation of the simulation device 50, so that the durability of the simulation device 50 can be improved and the inflow of foreign matter from the outside may be blocked.

The braking device 1 according to the embodiment of the present disclosure may include the hydraulic pressure supply device 100 configured to operate mechanically and to receive a braking intent from the driver in a form of an electrical signal from the pedal displacement sensor 11 sensing a displacement of the brake pedal 10; a hydraulic pressure controller 200 configured with first and second hydraulic pressure circuits 201 and 202, which are each provided with two wheels among the wheels RR, RL, FR, and FL and configured to control the flow of a hydraulic pressure delivered to the wheel cylinders 40 provided at the wheels RR, RL, FR, and FL; a first cut valve 261 provided at the first backup flow path 251 connecting the first hydraulic pressure port 24a to the first hydraulic pressure circuit 201 and configured to control the flow of the hydraulic pressure; a second cut valve 262 provided at the second backup flow path 252 connecting the second hydraulic pressure port 24b to the second hydraulic pressure circuit 202 and configured to control the flow of the hydraulic pressure; and the controller 320 configured to control the hydraulic pressure supply device 100 and valves based on hydraulic pressure information and pedal displacement information.

The hydraulic pressure supply device 100 may provide the oil pressure delivered to the wheel cylinder 40. The hydraulic pressure supply device 100 may be variously provided. As an example, a piston (not shown) driven by the driving force of a motor (not shown) may push the oil into the chamber to deliver a hydraulic pressure to the wheel cylinder 40. The hydraulic pressure supply device 100 may be provided in a motor-driven pump or a high-pressure accumulator.

More particularly, when the driver presses the brake pedal 10, an electrical signal is transmitted from the pedal displacement sensor 11 as the displacement of the brake pedal 10 changes, and the motor operates by the electrical signal. Between the motor and the piston, a power converter configured to convert a rotational movement of the motor into a rectilinear movement may be provided. The power converter may include a worm, a worm gear, and/or a rack and pinion gear.

The hydraulic pressure controller 200 may be configured with the first hydraulic pressure circuit 201 and the second hydraulic pressure circuit 202 which each receives a hydraulic pressure and controls two wheels. As one example, the first hydraulic pressure circuit 201 may control the front right wheel FR and the rear left wheel RL, and the second hydraulic pressure circuit 202 may control the front left wheel FL and the rear right wheel RR. Further, the wheel cylinder 40 is installed at each of the wheels FR, FL, RR, and RL to perform braking by receiving the hydraulic pressure.

The hydraulic pressure controller 200 may include an inlet valve (not shown) provided at the front end of each of the wheel cylinders 40 to control the hydraulic pressure and an outlet valve (not shown) that branches off between the inlet valve and the wheel cylinder 40 and is connected to the reservoir 30.

Next, the connection relationship between the reservoir 30 and the hydraulic circuit according to the embodiment of the present disclosure will be described.

The reservoir 30 according to the embodiment of the present disclosure may include three reservoir chambers 31, 32, and 33. As an example, the three reservoir chambers 31, 32, and 33 may be arranged side by side in a row.

The adjacent reservoir chambers 31, 32, and 33 may be divided by partition walls. For example, the first reservoir chamber 31 and the second reservoir chamber 33 may be divided into a first partition wall, and the second reservoir chamber 33 and a third reservoir chamber 21 may be divided into a second partition wall.

The first partition wall and the second partition wall are partially opened, and the first to third reservoir chambers 31, 32, and 33 may communicate with each other. Therefore, the pressures of the first to third reservoir chambers 31, 32, and 33 may be equal to each other. As an example, the pressures of the first to third reservoir chambers 31, 32, and 33 may be equal to atmospheric pressure.

The first reservoir chamber 31 may be connected to the first master chamber 20a of the master cylinder 20, the wheel cylinder 40 and the simulation device 50. The first reservoir chamber 31 may be connected to the first master chamber 20a through the first reservoir flow path 61. The first reservoir chamber 31 may be connected to two wheel cylinders of the four wheel cylinders 40, for example, the wheel cylinders 40 provided on the right front wheel FR and the left rear wheel RL.

The connection between the first reservoir chamber 31 and the first master chamber 20a may be controlled by the check valve 67 and the check valve 60, the connection between the first reservoir chamber 31 and the simulation device 50 may be controlled by the simulator valve 54 and the simulator check valve 55, and the connection between the first reservoir chamber 31 and the wheel cylinder 40 may be controlled by the outlet valve (not shown) provided in the hydraulic pressure controller 200.

The second reservoir chamber 32 may be connected to the second master chamber 20b of the master cylinder 20 and the wheel cylinder 40. The second reservoir chamber 32 may be connected to the second master chamber 20b through the second reservoir flow path 62. The second reservoir chamber 32 may be connected to the other two wheel cylinders of the four wheel cylinders 40, for example, the wheel cylinders 40 provided on the right rear wheel RR and the left front wheel FL.

The connection between the second reservoir chamber 32 and the second master chamber 20b may be controlled by a first control valve 330 or a second control valve 340 illustrated in FIG. 2. The connection between the second reservoir chamber 32 and the hydraulic pressure controller 200 may be controlled by the outlet valve (not shown) provided in the hydraulic pressure controller 200.

In addition, the third reservoir chamber 33 may be connected to the hydraulic pressure supply device 100. The third reservoir chamber 33 may be connected to various hydraulic pressure supply devices. As an example, the third reservoir chamber 33 may be connected to a pump.

The reservoir 30 may separately provide the third reservoir chamber 33 connected to the hydraulic pressure supply device 100 and the first and second reservoir chambers 31 and 32 connected to the first and second master chambers 20a and 20b. If the reservoir chamber for supplying the oil to the hydraulic pressure supply device 100 and the reservoir chamber for supplying the oil to the first and second master chambers 20a and 20b are provided in the same manner, the reservoir 30 may not properly supply the oil to the first and second master chambers 20a and 20b when the reservoir 30 fails to properly supply the oil to the hydraulic pressure supply device 100.

The reservoir 30 may separately provide the third reservoir chamber 33 and the first and second reservoir chambers 31 and 32. Accordingly, when emergency oil supplied to the hydraulic pressure supply device 100 fails, the reservoir 30 supplies oil normally to the first and second master chambers 20a and 20b to perform emergency braking.

Similarly, the reservoir 30 may separately provide the first reservoir chamber 31 connected to the first master chamber 20a and the second reservoir chamber 32 connected to the second master chamber 20b. If the reservoir chamber for supplying the oil to the first master chamber 20a and the reservoir chamber for supplying the oil to the second master chamber 20b are provided in the same manner, the reservoir 30 may not properly supply the oil to the second master chamber 20b when the reservoir 30 fails to properly supply the oil to the first master chamber 20a.

The reservoir 30 may separately provide the first reservoir chamber 31 and the third reservoir chamber 33. Accordingly, when emergency oil supplied to the first master chamber 20a fails, the reservoir 30 supplies oil normally to the second master chamber 20b to form a braking pressure on the two wheel cylinders 40 of the four wheel cylinders 40.

The reservoir 30 may separate an oil line (not shown) connected to the reservoir 30 from the hydraulic pressure supply device 100 and a dump line (not shown) connected to the reservoir 30 from the wheel cylinder 40. Therefore, it is possible to prevent bubbles that may occur in the dump line from being introduced into the chamber of the hydraulic pressure supply device 100 during the ABS braking, thereby preventing the ABS performance from being lowered.

Reference numeral PS1 is a hydraulic flow path pressure sensor configured to sense the hydraulic pressure of the first and second hydraulic pressure circuits 201 and 202, and reference numeral PS2 is a backup flow path pressure sensor configured to measure the oil pressure of the master cylinder 20.

Hereinafter, the pressure in the wheel cylinder of the wheel is referred to as a braking pressure, and a frictional force for blocking the rotation of the wheel is referred to as a braking force, with a force indicating a braking effect on the vehicle.

When the driver depresses the brake pedal 10 in a normal state, the braking device 1 that provides the braking effect to the vehicle which receives a braking intent from the driver in a form of an electrical signal from a pedal displacement sensor which senses a displacement of the brake pedal 10 and then supplies a braking pressure to the wheel cylinder. Thereby the braking device 1 may provide the braking force to the vehicle.

Alternatively, the braking device 1 cannot provide sufficient braking force to the vehicle in an abnormal state. Here, the abnormal state refers to not only cases where the hydraulic pressure supply device 100 is not operating normally but also cases where the braking pressure generated by the braking device 1 is different from the braking pressure when the braking device 1 operates normally.

In particular, when the braking device 1 is in an abnormal state, it may include a case where an abnormality occurs in the hydraulic pressure supply device 100 itself, a case where an abnormality occurs in a valve or the like in the hydraulic pressure controller 200, and a case where the simulator valve 54 or the like is leaked and sufficient hydraulic pressure is not generated, and the like.

For example, when the hydraulic pressure supply device 100 of the braking device 1 does not operate normally, that is, in the abnormal state, the fallback mode in which the hydraulic pressure of the master cylinder 20 is immediately transmitted to the wheel cylinder 40 may be operated. In this case, when the driver provides the same brake pedal pressure, the braking force in the fallback mode differs from the braking force when the hydraulic pressure supply device 100 normally operates.

In particular, the braking force in the fallback mode is smaller than the braking force provided by the braking device 1 in the normal state, and it takes more time to form the braking pressure. In the case where there is no input of the driver's pedal as in the case of an autonomous emergency braking (AEB) operation, the braking pressure may be generated only when the hydraulic pressure supply device 100 operates normally. Therefore, when the hydraulic pressure supply device 100 does not operate normally, it is impossible to generate the braking pressure. As described above, securing additional braking force in the abnormal state of the braking device 1 is closely related to the safety of the driver.

Further, in order to secure additional braking force, the braking force requested when the vehicle drives at a high speed is greater than the braking force requested when the vehicle drives at a low speed, thus it is important to secure an effective braking force according to the speed of the vehicle.

Therefore, the brake control apparatus 300 according to the disclosed embodiment may request the cooperation of the control modules 400 of the vehicle other than the braking device 1 to secure additional braking force.

Figure 3:
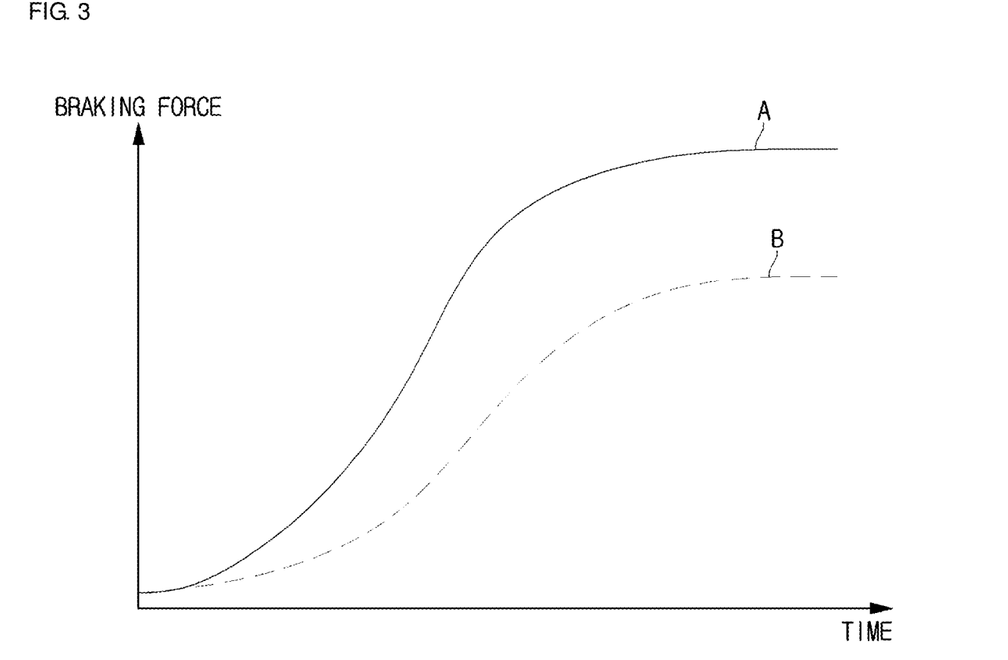
FIG. 3 is a graph for explaining a control method of the brake control apparatus according to an embodiment.

FIG. 3 is a graph for explaining a control method of the brake control apparatus 300 according to an embodiment.

Referring to FIG. 3, the x-axis refers a time, the y-axis refers to the braking pressure, and A is a graph illustrating the braking force applied to the vehicle by the normal state of the braking device 1 with respect to time. B is a graph illustrating the braking force in the fallback mode with time when the braking device 1 is in the abnormal state.

Referring to FIG. 3, it is difficult for the braking device 1 in the normal state to reach the braking force for braking of the vehicle only by the braking force in the fallback mode. Accordingly, in addition to the braking force in the fallback mode, the brake control apparatus 300 according to the embodiment may secure the braking force for braking of the vehicle in the normal state by the braking by the motor, the braking by the engine, or a combination thereof.

At this time, an insufficient braking force may be secured by the brake control apparatus 300 transmitting the coordination control command to at least one of the control modules 400 of the vehicle to control each control module.

Hereinafter, the braking force provided by the braking device for braking the vehicle is referred to as a main braking force, and the braking force provided by at least one of the plurality of control modules for braking the vehicle when the braking device is abnormal is referred to as an auxiliary braking force.

Hereinafter, the operation of the controller 320 of the brake control apparatus 300 for securing the auxiliary braking force will be described in detail.

When the failure determination device 310 senses the abnormal state of the braking device 1, the controller 320 may control the control modules 400 of the vehicle to provide the auxiliary braking force for securing the same braking force as the main braking force provided to the vehicle by the braking device 1 in the normal state. In particular, the controller 320 may control the at least one of the plurality of control modules 400 of the vehicle by transmitting the coordination control command.

In addition, the controller 320 may select at least one of the control modules 400 of the vehicle and control the selected at least of the one control modules to provide the auxiliary braking force for securing the braking force. At this time, the controller 320 may select at least one control module based on the speed of the vehicle measured by the speed measuring device 530 among the control modules 400 of the vehicle.

In particular, the controller 320 may compare the speed of the vehicle with a predetermined reference speed V and select at least one of the control modules of the vehicle's control modules 400 based on the comparison result.

In this case, the controller 320 may select at least one of the control modules of the vehicle's control modules 400 when the speed of the vehicle is greater than the predetermined reference speed V. Here, the reference speed may refer to a minimum speed that is a reference when it is determined that the vehicle is driving at the high speed. This reference speed may also refer to the vehicle speed at which the braking by the parking brake has safety above a certain reference.

When it is determined that the vehicle is driving at the high speed, the controller 320 may preferentially control at least one of the engine control module 410 and the motor control module 450 among the control modules 400 of the vehicle.

Since the braking by the parking brake normally brakes only the rear wheels, there is a danger of spinning, and therefore, the safety may be low when the vehicle is driving at the high speed. In consideration of the stability of the braking by the parking brake, the controller 320 may preferentially control at least one of the engine control module 410 and the motor control module 450 rather than the parking brake among the vehicle's control modules 400. Thereby the safety of the driver may be achieved.

Meanwhile, the controller 320 may determine that the vehicle is currently driving at the low speed when the speed of the vehicle is equal to or lower than the predetermined reference speed V. Accordingly, the controller 320 may select and control the parking brake control module 470 of the control modules 400 of the vehicle.

The controller 320 may increase the efficiency of the brake system by changing the control module to transmit the cooperative control command when the vehicle is driving at the high speed and when driving at the low speed.

When the failure determining device 310 senses the abnormal state of the braking device 1, the controller 320 according to another embodiment may select and control at least one of the control modules 400 of the vehicle based on the speed of the vehicle depending on whether or not the pressure applied to the brake pedal 10 is sensed by the pressure sensing device 510.

In particular, when the braking device 1 is in the abnormal state, when the pressure applied to the brake pedal 10 by the pressure sensing device 510 is sensed, the controller 320 may compare the braking pressure corresponding to the pressure applied to the brake pedal 10 with a predetermined target braking pressure.

Here, the braking pressure corresponding to the pressure applied to the brake pedal 10 may refer to the braking pressure in the fallback mode in which the hydraulic pressure of the master cylinder 20 is directly transmitted to the wheel cylinder 40, which may be determined by the controller 320 based on the pressure applied to the brake pedal 10, or sensed by the hydraulic flow path pressure sensor PS1 sensing the hydraulic pressure of the first and second hydraulic pressure circuits 201 and 202.

The target braking pressure may refer to the minimum braking pressure at which the auxiliary braking force is unnecessary. The target braking pressure may be received from the outside or may be determined by an internal calculation of the automatic control device.

When the braking pressure determined by the pressure applied to the brake pedal 10 is smaller than the predetermined target braking pressure, the controller 320 may select and control at least one of the control modules 400 of the vehicle based on the speed of the vehicle.

Alternatively, when the pressure applied to the brake pedal 10 by the pressure sensing device 510 is not sensed, the controller 320 may determine whether the autonomous emergency braking 550 is operating and may select and control at least one of the control modules 400 of the vehicle based on the speed of the vehicle.

In particular, when there is an operation of the autonomous emergency braking 550, the controller 320 may select and control at least one of the control modules 400 of the vehicle based on the speed of the vehicle. At this time, the method of selecting and controlling at least one of the control modules 400 based on the speed of the vehicle is the same as described above.

Accordingly, the controller 320 may secure not only the braking force of the autonomous emergency braking 550 but also additional braking force even when there is no pressure applied to the brake pedal 10 by the driver when the braking device is in the abnormal state.

Up to now, the brake system including the brake control apparatus 300 according to the embodiment has been described. In FIG. 2, the failure determination device 310 is provided together with the controller 320 in the configuration of the brake control apparatus 300. However, the failure determination device 310 may be provided in one configuration of the controller 320, but it is not limited to the illustrated example.

Also, unlike that which is illustrated in FIG. 2, the controller 320 may include the pressure sensing device 510, the speed measuring device 530, the autonomous emergency braking 550, or a combination thereof.

Hereinafter, the operation of the brake control apparatus 300 for securing the braking force will be described in detail with reference to FIGS. 4 to 7.

Figure 4:
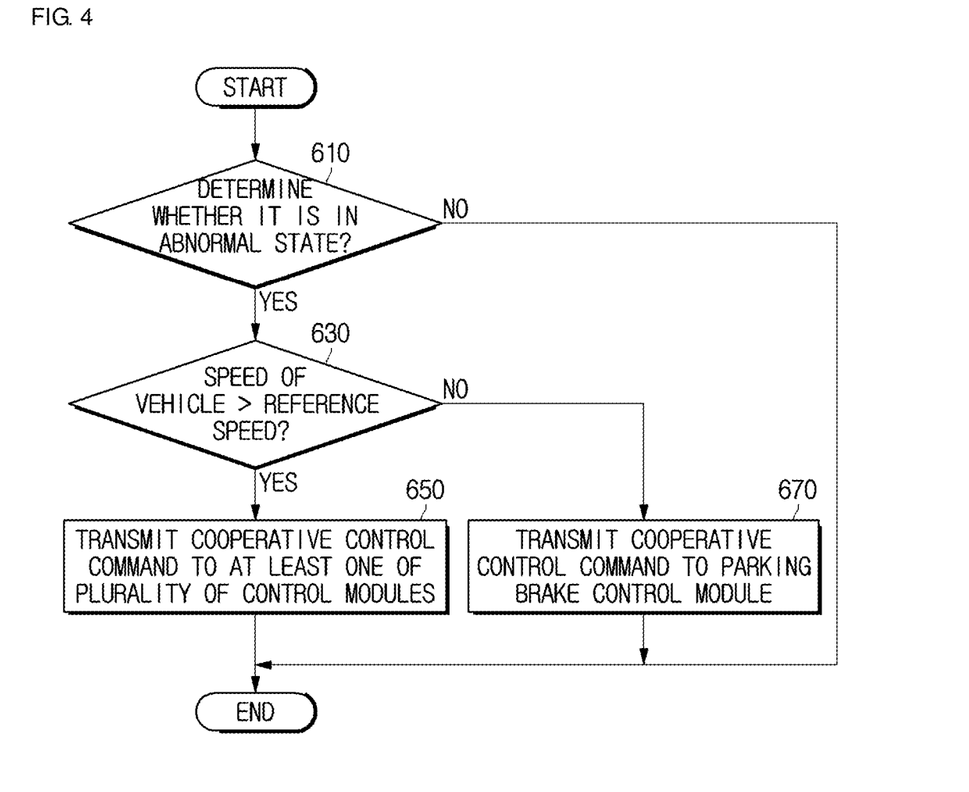
FIG. 4 is a flowchart of the control method of the brake control apparatus according to an embodiment.

FIG. 4 is a flowchart of the control method of the brake control apparatus according to an embodiment.

First, the failure determination device 310 may determine whether the braking device 1 is in the abnormal state (610). When the failure determination device 310 senses the abnormal condition of the braking device 1, the controller 320 may determine whether the vehicle speed is greater than the predetermined reference speed (630).

At this time, when it is determined that the speed of the vehicle has a value larger than the predetermined reference speed (when the vehicle drives at the high speed), the controller 320 may transmit the cooperative control command to at least one of the plurality of control modules 400 (650). In particular, the controller 320 may transmit the cooperative control command to at least one of the plurality of control modules 400 including the engine control module 410, the motor control module 450 and the parking brake control module 470.

When it is determined that the speed of the vehicle is less than or equal to the predetermined reference speed ((when the vehicle drives at the low speed), the controller 320 may transmit the cooperative control command to the parking brake control module 470 of the vehicle's control modules 400 (670).

As described above, the brake control apparatus 300 may be different from the control module for transmitting the cooperative control command in each case by dividing the case where the vehicle drives at the high speed and the case where the vehicle drives at the low speed, through comparison with the predetermined reference speed.

Accordingly, the brake control apparatus 300 may increase the efficiency of the brake system by differently securing the braking force according to the vehicle speed. In the case of the high speed driving, the controller 320 may solve the stability problem of the parking brake by transmitting the cooperative control command to at least one of the engine control module 410 and the motor control module 450.

Figure 5:
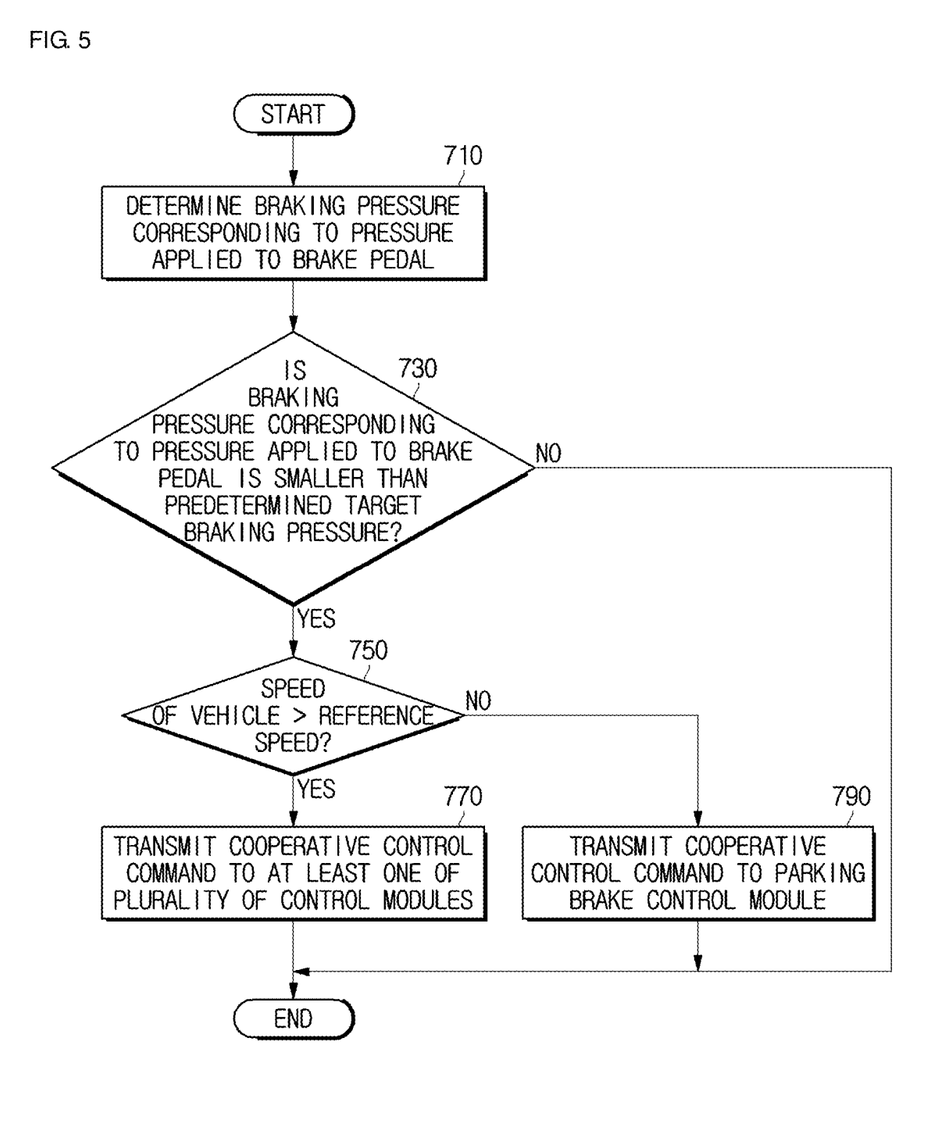
FIG. 5 is a flowchart of the control method of the brake control apparatus according to another embodiment.

FIG. 5 is a flowchart of the control method of the brake control apparatus according to another embodiment. More particularly, it is a flowchart of a control method of the brake control apparatus 300 when the pressure applied to the brake pedal 10 by the pressure sensing device 510 is sensed.

When the pressure applied to the brake pedal 10 is sensed by the pedal displacement sensor 11 included in the pressure sensing device 510, the controller 320 may determine the braking pressure corresponding to the pressure applied to the brake pedal 10 (710). Thereafter, the controller 320 may determine whether the braking pressure corresponding to the pressure applied to the brake pedal 10 is smaller than the predetermined target braking pressure (730).

At this time, when the braking pressure corresponding to the pressure applied to the brake pedal 10 is smaller than the predetermined target braking pressure, the controller 320 may determine whether the speed of the vehicle measured by the speed measuring device 530 is greater than the predetermined reference speed (750).

When the speed of the vehicle is greater than the predetermined reference speed, the controller 320 may transmit the coordinated control command to at least one of the plurality of control modules 400 (770).

When the speed of the vehicle is less than or equal to the predetermined reference speed, the controller 320 may transmit the cooperative control command to the parking brake control module 470 of the vehicle's control modules 400 (790).

Accordingly, it is possible to provide additional braking force to increase the efficiency of the brake system only when the braking pressure corresponding to the pressure applied to the brake pedal 10 is smaller than the target braking pressure.

Figure 6:
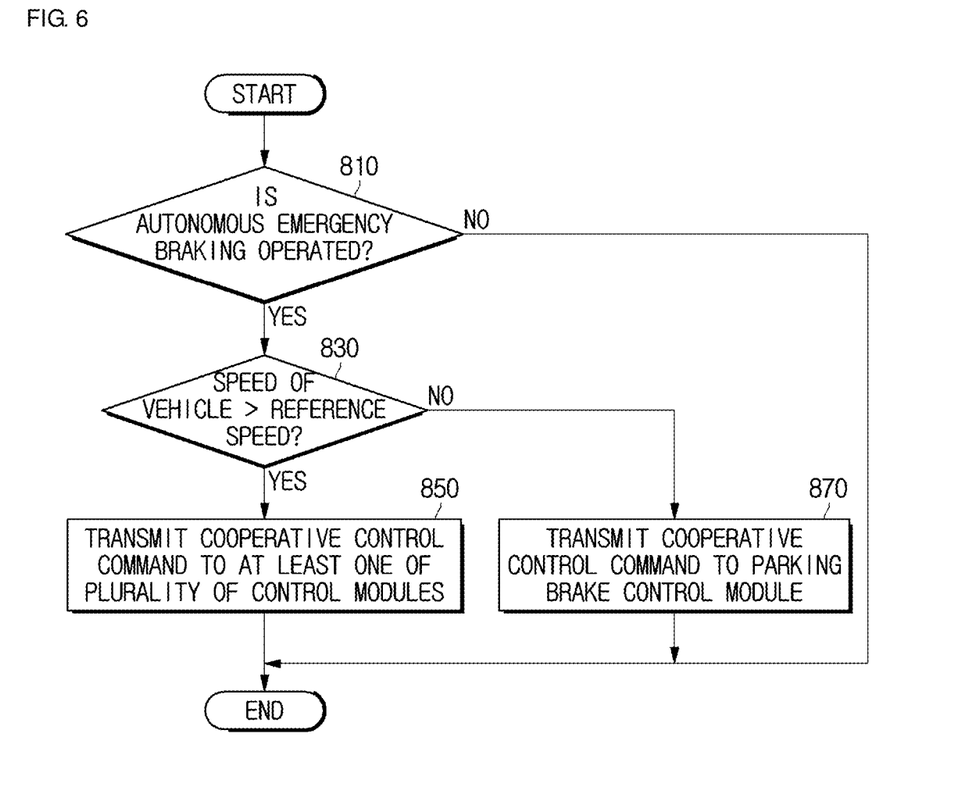
FIG. 6 is a flowchart of the control method of the brake control apparatus according to another embodiment.

FIG. 6 is a flowchart of the control method of the brake control apparatus according to another embodiment. More particularly, it is a flowchart of a control method of the brake control apparatus 300 when the pressure applied to the brake pedal 10 by the pressure sensing device 510 is not sensed.

When the pressure applied to the brake pedal 10 is not sensed by the pedal displacement sensor 11 included in the pressure sensing device 510, the controller 320 may determine whether the autonomous emergency braking 550 is operating (810).

Thereafter, when it is determined that the autonomous emergency braking 550 is operating, the controller 320 may determine whether the speed of the vehicle measured by the speed measuring device 530 is greater than the predetermined reference speed (830).

When the speed of the vehicle is greater than the predetermined reference speed, the controller 320 may transmit the coordinated control command to at least one of the plurality of control modules 400 (850).

When the speed of the vehicle is less than or equal to the predetermined reference speed, the controller 320 may transmit the cooperative control command to the parking brake control module 470 of the vehicle's control modules 400 (870).

Accordingly, the controller 320 may secure not only the braking force of the autonomous emergency braking 550 but also additional braking force even when there is no pressure applied to the brake pedal 10 by the driver when the braking device is in the abnormal state.

Figure 7:
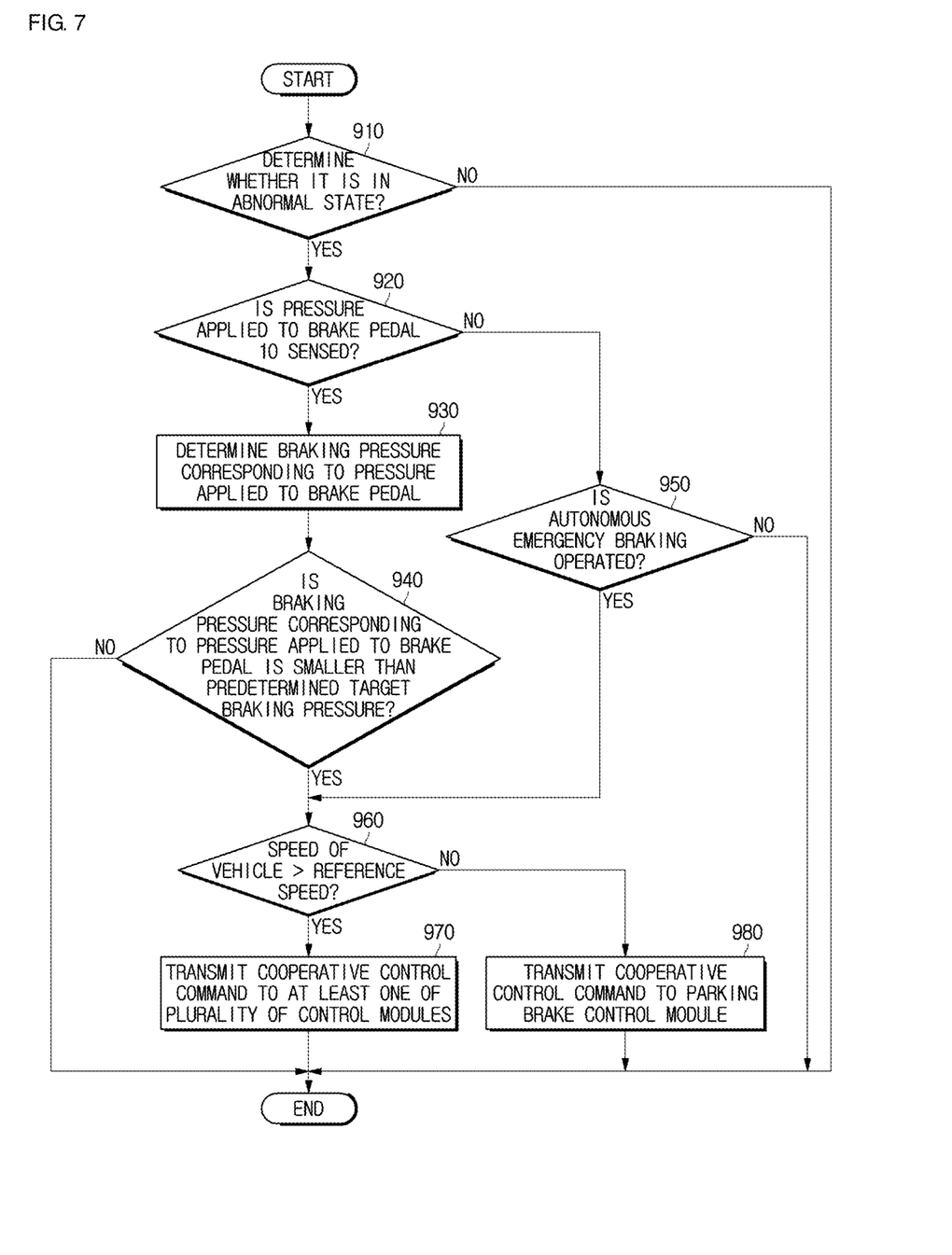
FIG. 7 is a flowchart of the control method of the brake control apparatus according to another embodiment.

FIG. 7 is a flowchart of the control method of the brake control apparatus according to another embodiment.

First, the failure determination device 310 may determine whether the braking device 1 is in the abnormal state (910). When the failure determination device 310 senses the abnormal condition of the braking device 1, the controller 320 may determine whether the pressure applied to the brake pedal 10 is sensed by the pedal displacement sensor 11 included in the pressure sensing device 510 (920).

When the pressure applied to the brake pedal 10 is sensed by the pedal displacement sensor 11 included in the pressure sensing device 510, the controller 320 may determine the braking pressure corresponding to the pressure applied to the brake pedal 10 (930). Thereafter, the controller 320 may determine whether the braking pressure corresponding to the pressure applied to the brake pedal 10 is smaller than the predetermined target braking pressure (940).

When the braking pressure corresponding to the pressure applied to the brake pedal 10 is smaller than the predetermined target braking pressure, the controller 320 may determine whether the speed of the vehicle measured by the speed measuring device 530 is greater than the predetermined reference speed (960).

Alternatively, when the pressure applied to the brake pedal 10 is not sensed by the pedal displacement sensor 11 included in the pressure sensing device 510, the controller 320 may determine whether the autonomous emergency braking 550 is operating (950). Thereafter, when it is determined that the autonomous emergency braking 550 is operating, the controller 320 may determine whether the speed of the vehicle measured by the speed measuring device 530 is greater than the predetermined reference speed (960).

When the speed of the vehicle is compared with the predetermined reference speed and the speed of the vehicle is greater than the predetermined reference speed, the controller 320 may transmit the coordinated control command to at least one of the plurality of control modules 400 (970).

Alternatively, when the speed of the vehicle is less than or equal to the predetermined reference speed, the controller 320 may transmit the cooperative control command to the parking brake control module 470 of the vehicle's control modules 400 (980).

Thus, when the braking device 1 is in the abnormal state, additional braking force may be provided without any additional configurations. Additional braking force may be secured to reduce the gap between the braking force provided by the normal braking device to the vehicle. Further, the efficiency of the brake system of the vehicle may be increased by changing the method of securing the braking force according to the speed of the vehicle.

As is apparent from the above description, the brake control apparatus and the brake control method according to an embodiment may provide additional braking force without an additional configuration when the braking device is in the abnormal state. This may provide additional braking force to reduce the gap between the normal state braking force and the braking force provided to the vehicle.

The exemplary embodiments of the present disclosure have thus far been described with reference to the accompanying drawings. It will be obvious to people of ordinary skill in the art that the present disclosure may be practiced in other forms than the exemplary embodiments as described above without changing the technical idea or essential features of the present disclosure. The above exemplary embodiments are only by way of example, and should not be interpreted in a limited sense.

What is claimed is:

1. A brake control apparatus comprising:
a braking device configured to generate a braking pressure based on a hydraulic pressure to provide a main braking force to a vehicle, wherein the braking device comprises a hydraulic pressure supply device configured to generate the hydraulic pressure using a driving force of a motor in a normal state of the braking device and a master cylinder configured to generate the hydraulic pressure according to a pedal effort of a brake pedal in an abnormal state of the braking device; and
a controller configured to:
control, in the normal state of the braking device, the hydraulic pressure supply device generating the hydraulic pressure,
compare, in the abnormal state of the braking device, the hydraulic pressure generated by the master cylinder according to the pedal effort with a target brake pressure,
in response to the hydraulic pressure generated by the master cylinder being less than the target brake pressure, control at least one control module selected based on a speed of the vehicle among a plurality of control modules including an engine control module (EMS) of the vehicle, a motor control module and a parking brake control module to provide an auxiliary braking force to the vehicle, in response to the speed of the vehicle being greater than a predetermined reference speed, control at least one of the engine control module (EMS) and the motor control module to provide the auxiliary braking force to the vehicle, and in response to the speed of the vehicle being equal to or lower than the predetermined reference speed, control the parking brake control module to provide the auxiliary braking force to the vehicle.

2. The brake control apparatus according to claim 1, wherein the controller is configured to transmit a coordination control command to the at least one of the plurality of control modules to provide the auxiliary braking force to the vehicle when the braking device is in the abnormal state.

3. The brake control apparatus according to claim 1, wherein, when the braking device is in the abnormal state, the controller is configured to control at least one of the plurality of control modules selected based on the speed of the vehicle among the plurality of control modules to provide the auxiliary braking force to the vehicle when the braking pressure corresponding to the pressure applied to a brake pedal is smaller than a predetermined target braking pressure.

4. The brake control apparatus according to claim 1, wherein when the braking device is in the abnormal state, the controller is configured to control the at least one of the plurality of control modules selected based on whether or not autonomous emergency braking (AEB) is operated when the pressure applied to a brake pedal is not sensed.

5. The brake control apparatus according to claim 4, wherein, when the braking device is in the abnormal state, the controller is configured to control the at least one of the plurality of control modules when the pressure applied to the brake pedal is not sensed and the operation of the autonomous emergency braking (AEB) is active.

6. A brake control method comprising:
determining whether a braking device for generating a braking pressure based on a hydraulic pressure and providing a main braking force to a vehicle is in an abnormal state, wherein the braking device comprises a hydraulic pressure supply device configured to generate the hydraulic pressure using a driving force of a motor in a normal state of the braking device and a master cylinder configured to generate the hydraulic pressure according to a pedal effort of a brake pedal in the abnormal state of the braking device;

controlling, in the normal state of the braking device, the hydraulic pressure supply device generating the hydraulic pressure;

comparing, in the abnormal state of the braking device, the hydraulic pressure generated by the master cylinder according to the pedal effort with a target brake pressure; and in response to the hydraulic pressure generated by the master cylinder being less than the target brake pressure, controlling at least one control module selected based on a speed of the vehicle among a plurality of control modules including an engine control module (EMS) of the vehicle, a motor control module and a parking brake control module to provide an auxiliary braking force to the vehicle when the braking device is in the abnormal state, wherein the controlling of the at least one control module comprises:

in response to the speed of the vehicle being greater than a predetermined reference speed, controlling at least one of the engine control module (EMS) and the motor control module to provide the auxiliary braking force to the vehicle; and in response to the speed of the vehicle being equal to or lower than the predetermined reference speed, controlling the parking brake control module to provide the auxiliary braking force to the vehicle.

7. The method according to claim 6, wherein the controlling of at least one of the plurality of control modules comprises:

selecting the at least one of the plurality of control modules based on the speed of the vehicle when the braking device is in the abnormal state; and transmitting a coordination control command to the selected at least one of the plurality of control modules to provide the auxiliary braking force to the vehicle.

8. The method according to claim 6, further comprising:
sensing a pressure applied to a brake pedal,
wherein the controlling of at least one of the plurality of control modules comprises:

when the braking device is in the abnormal state, controlling the at least one of the plurality of control modules selected based on the speed of the vehicle among the plurality of control modules including the engine control module (EMS) of the vehicle, the motor control module and the parking brake control module to provide the auxiliary braking force to the vehicle when the braking pressure corresponding to the sensed pressure is smaller than a predetermined target braking pressure, wherein the controlling of the at least one control module comprises:

controlling at least one of the engine control module (EMS) and the motor control module when the speed of the vehicle is greater than a predetermined reference speed and controlling the parking brake control module when the speed of the vehicle is equal to or lower than the predetermined reference speed.

9. The method according to claim 6,
wherein the controlling of at least one of the plurality of control modules comprises:

when the braking device is in the abnormal state, controlling the at least one of the plurality of control modules selected based on whether or not autonomous emergency braking (AEB) is operated when the pressure applied to the brake pedal is not sensed.

10. The method according to claim 9, wherein the controlling of at least one of the plurality of control modules comprises:

when the braking device is in the abnormal state, controlling the at least one of the plurality of control modules when the pressure applied to the brake pedal is not sensed and the operation of the autonomous emergency braking (AEB) is active.

* * * * *